United States Patent [19]
Krolick, deceased et al.

[11] 4,029,162

[45] June 14, 1977

[54] ZERO RETURN TARE GUARD

[75] Inventors: James J. Krolick, deceased, late of Dayton, Ohio, by Arline Krolick, executrix; Edwin E. Boshinski, Dayton, Ohio

[73] Assignee: Hobart Corporation, Troy, Ohio

[22] Filed: Oct. 15, 1975

[21] Appl. No.: 622,723

[52] U.S. Cl. .......................... 177/165; 177/DIG. 3
[51] Int. Cl.² ...................................... G01G 23/14
[58] Field of Search .............. 177/164, 165, DIG. 3

[56] References Cited
UNITED STATES PATENTS

| 3,727,706 | 4/1973 | Streater et al. | 177/165 X |
| 3,786,881 | 1/1974 | Allen et al. | 177/165 X |
| 3,869,005 | 3/1975 | Williams, Jr. et al. | 177/165 X |

Primary Examiner—George H. Miller, Jr.
Attorney, Agent, or Firm—Biebel, French & Nauman

[57] ABSTRACT

Tare adjusting apparatus for a computing scale includes a tare adjustment knob for establishing the no-load reference position of the scale and thus compensating for the weight of the packaging material of the product being weighed. A sensing circuit includes a switch for detecting when the tare adjustment knob is adjusted or set to zero and an oscillator circuit for determining when the tare adjustment knob is manually touched. A tare warning lamp is controlled by a control circuit which is responsive to the sensing circuit for lighting the tare warning lamp if the operator should touch the tare adjustment knob during a weighing operation. The tare warning lamp is lit before each weighing operation by the control circuit and is extinguished only when the tare adjustment knob is adjusted or set to zero. Thus the operator is reminded that the proper tare setting may need to be reset after each weighing operation. An alternative embodiment requires that the tare adjustment knob be set to zero and touched before each weighing to prevent an operator from inadvertently setting the tare adjustment at zero for a series of weighing operations.

10 Claims, 4 Drawing Figures

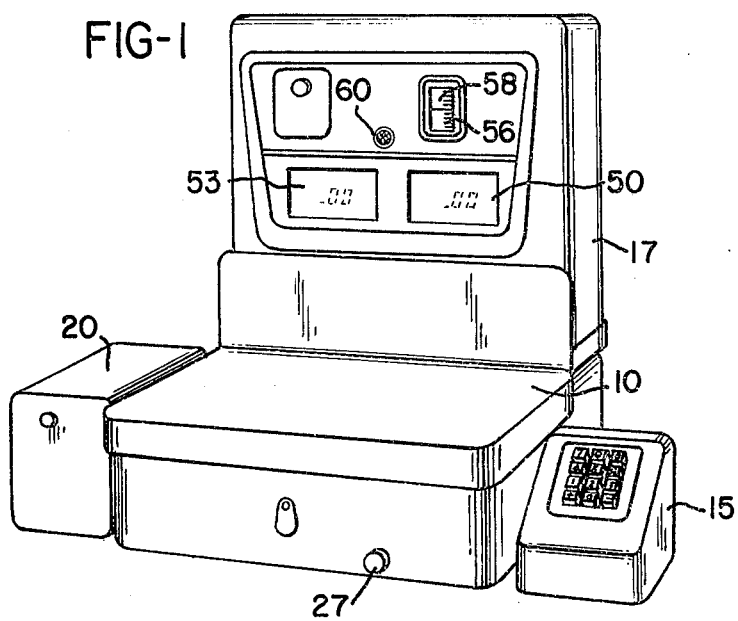
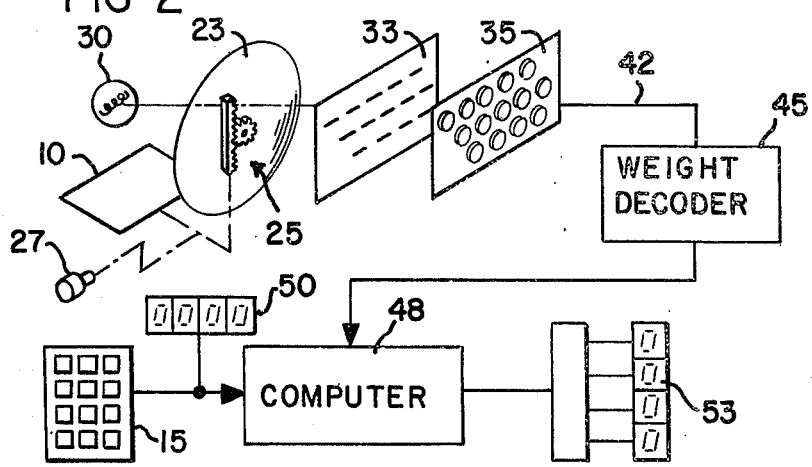
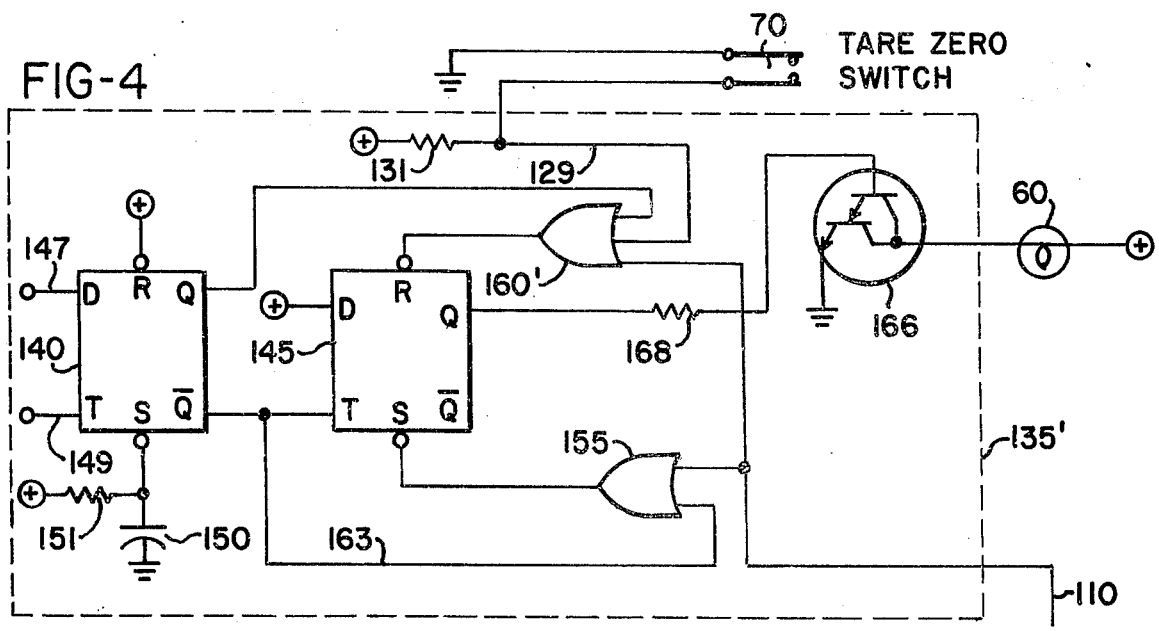

ZERO RETURN TARE GUARD

BACKGROUND OF THE INVENTION

This invention relates to tare adjustment apparatus for computing scale systems of the type which includes a scale and a computer for weighing and computing automatically the value of each of successively weighed loads or articles.

A system of the general type to which the invention relates is shown in U.S. Pat. No. 3,741,324. Such a weighing scale includes provision for display of the price per unit weight and the total price or value of goods placed on a scale platform. The weight of the goods is visually displayed by an optical projection arrangement. An optical chart, connected to the scale platform, moves in proportion to the weight of the goods. This chart includes both human recognizable and machine recognizable indicia representing weight. The human recognizable indicia is projected optically for continuous viewing by customers while a photodetector arrangement, in cooperation with the machine recognizable indicia on the chart, provides electronic signals indicating the weight of the goods. This electronic weight information is then multiplied by the price per unit weight information, supplied by the operator through a keyboard, and the resulting value is displayed.

In computing scale systems of the above mentioned type, it is desirable to make tare adjustments compensating for the weight of the container so that the net weight of the goods is accurately measured and the value correctly computed. Prior art computing scale systems have provided tare adjustment mechanisms for this purpose, as shown, for instance, in U.S. Pat. No. 3,037,563. Also, there have been provided previously interlock systems actuated by a change in unit price information to prevent operation of the scale until such time as the operator has physically moved the tare adjustment knob.

Further, as shown in U.S. Pat. No. 3,786,881, there have been provided weighing systems wherein a tare signal light is lit until the operator touches the tare adjustment knob prior to each weighing operation. Thus the operator is made aware of the tare setting before each weighing, even if no tare change is required. Provision is also made to activate the tare signal light if the tare adjustment knob should be touched accidentally during a weighing operation. A problem with such a weighting system is that the operator may be tempted to merely touch the tare adjustment knob before each weighing, even though successive containers vary in size and therefore require different tare settings.

SUMMARY OF THE INVENTION

This invention relates to an improved scale system for weighing loads in which a weighing mechanism is adapted to be deflected from a no-load position to a balance position in proportion to the weight of a load applied thereto. A manually positionable tare knob controls a tare adjusting means to establish the no-load reference position of the scale. The system further includes a signal lamp for producing a tare warning indication. A sensing arrangement determines when the manually positionable means is touched and also when the manually positionable means is adjusted. A control circuit, responsive to the sensing means, causes the lamp to produce a warning indication if the manually positionable tare knob is touched while the weighing mechanism is deflected substantially from its no-load position. The control circuit also acts to prevent a tare warning indication when the manually positionable tare knob is adjusted while the weighing mechanism is not substantially deflected from its no-load position.

The sensing arrangement includes an oscillator circuit which is electrically connected to the manually positionable tare knob so that the oscillator circuit will alter its oscillation state whenever the tare knob is touched. The sensing means also includes a switch which is mechanically connected to the manually positionable tare knob such that the switch is actuated when the tare knob is adjusted.

In an alternative embodiment, the control circuit may be arranged to prevent the signal means from producing a tare warning indication only when the manually positionable means is adjusted manually. Further, the switch which senses adjustment of the manually positionable tare knob may be arranged to indicate such adjustment only when the manually positionable means is set to a zero tare position.

It is therefore an object of the invention to provide tare adjusting apparatus for a scale including manual tare adjusting means and an indicator, in which the indicator is activated after each weighing operation and deactivated prior to the following weighing operation only if the tare adjusting means is adjusted while no weight is on the scale.

It is a further object of the invention to provide such apparatus in which the adjustment required for deactivating the indicator is zeroing of the manual tare adjusting means.

It is a further object of the invention to provide such apparatus in which both zeroing of the tare adjusting means and touching of the tare adjusting means are required prior to each weighing operation.

It is a further object of the invention to provide a scale having a provision for tare adjustment and manual tare adjusting means in which touching the manual tare adjusting means during a weighing operation results in an indicator providing a tare warning indication.

Other objects and advantages of the invention will be apparent from the following description, the accompanying drawings and the appended claims.

BRIEF DESCRIPTION OF THE DRAWINGS

FIG. 1 is a perspective view showing a complete weighing and computing system incorporating the present invention;

FIG. 2 is a diagrammatic representation of a portion of the system of FIG. 1;

FIG. 4 is an electrically schematic diagram of a portion of a circuit of an alternative embodiment.

DETAILED DESCRIPTION OF THE INVENTION

Figure 3:
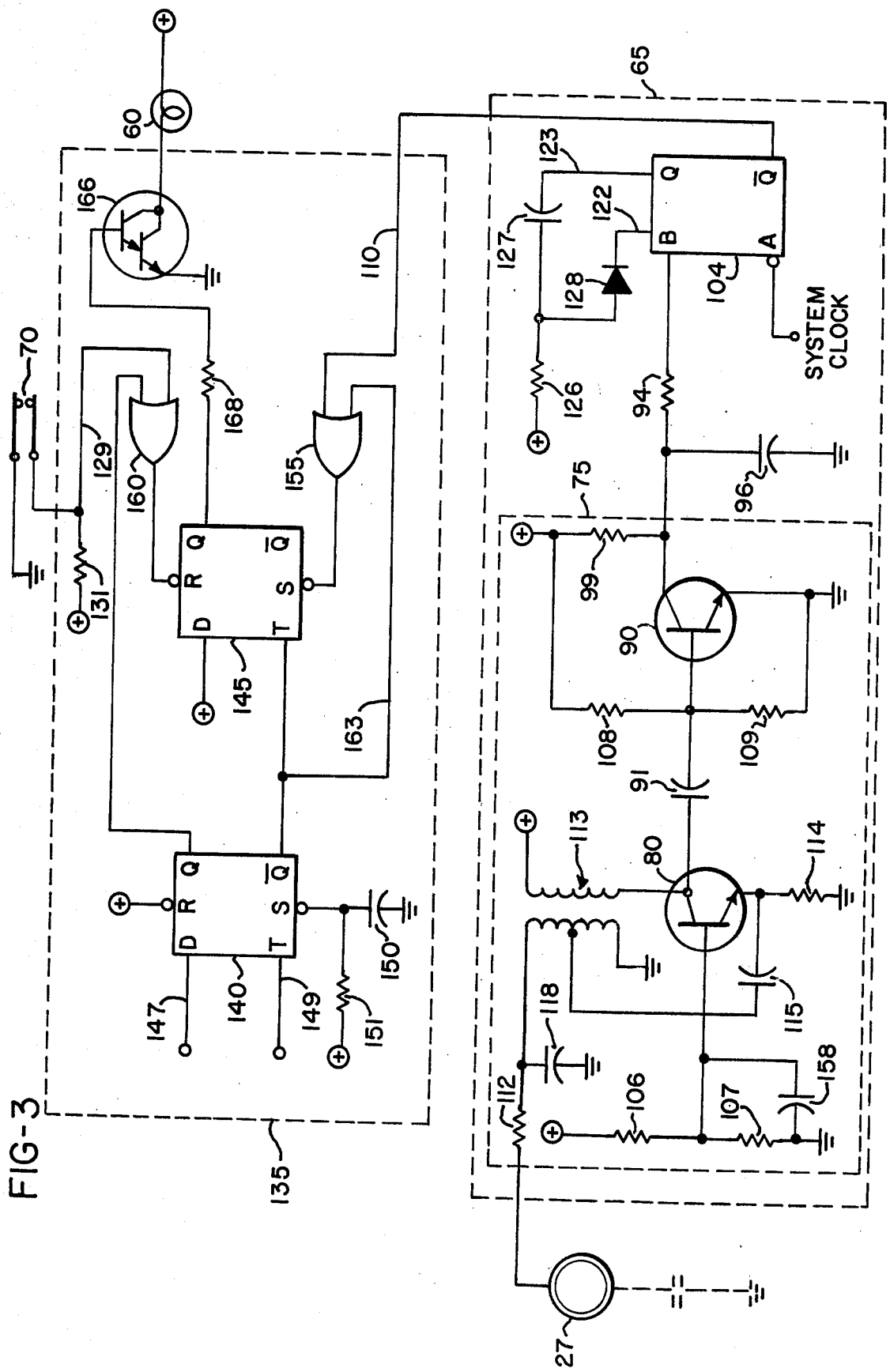
FIG. 3 is an electrical schematic diagram of the circuit controlling the tare lamp.

Referring to the drawings which illustrate the preferred embodiments of the invention, FIG. 1 is a perspective view showing a system for weighing loads in which the invention may find particular utility. An article receiving platform 10 is adapted to receive items to be weighed. Mounted adjacent to platform 10 is keyboard unit 15 which is a conventional keyboard for entering price per unit weight information into a computing circuit (not shown) within housing 17. Printer 20 is provided to print weight, price per pound and value information on a ticket for each item weighed. This weighing scale system is described more fully in U.S. Pat. No. 3,741,324, issued June 26, 1973 and assigned to the assignee of the present invention.

Referring now to FIG. 2, there is shown diagrammatically the basic functional elements of the computing scale of FIG. 1. The weighing scale mechanism includes article receiving platform 10 which is adapted to be deflected from a no-load position to a balance position in proportion to the weight of a load applied to the platform 10. Deflection of the platform 10 results in optical chart 23 being rotated by rack and pinion arrangement 25. Adjustment for the tare weight of packaging material is made by a scale operator by appropriately setting manually positionable or operable means comprising a tare adjustment knob 27. Knob 27 adjusts the mechanical linkage connecting platform 10 and rack and pinion arrangement 25 to adjust the zero balance position of the scale thereby providing a means for entering the tare weight of the load container into the weighing mechanism.

Optical chart 23, illuminated by lamp 30, has printed upon it both human readable and machine readable indicia of weight. When the platform 10 is moved to a balance position, the machine readable indicia of weight corresponding to weight on platform 10 are projected through slotted plate 33 onto a plurality of photodetectors 35. The photodetectors 35 convert this optical information into electrical signals which are then carried by a cable 42 to weight decoder 45. Computer 48 receives the price per pound information relating to the item being weighed from keyboard 15 at the same time that this information is displayed by display 50. Computer 48 computes the total value of the item weighed and this information is displayed by display 53. An optical path (not shown) is also provided in scale 17 to project the human readable weight indicia upon screen 56 for display. Screen 56 includes reference indicia 58 against which the human readable indicia may be referenced. As will be explained more completely below, tare lamp 60 is provided so that a warning indication may be given if tare adjustment is necessary or desirable prior to a weighing operation or if the operator should inadvertently touch the tare knob 27.

Referring now to FIG. 3, the tare warning circuit of a preferred embodiment of the invention is shown. Tare knob 27 is connected electrically to circuit 65 and mechanically to switch 70. Circuit 65 comprises a first sensing means which detects manual touching of tare adjusting means 27 while switch 70 comprises a second sensing means for determining when the tare weight is changed.

Circuit 65 includes an oscillator 75 which is connected to knob 27 such that the oscillator 75 changes its oscillating state when knob 27 is touched. Under normal conditions with the system energized, and knob 27 not touched the regularly recurring conduction of transistor 80 is coupled to transistor 90 by capacitor 91 so that transistor 90 is switched on and off periodically at the oscillation frequency. A large capacitor 96 in the collector circuit of transistor 90 does not have time to charge appreciably from the current flowing in resistor 99 while the transistor 90 is off. As a result the B input of flip-flop 104 remains LO. When the operator manually touches the tare adjustment knob 27, the oscillator is detuned to such a degree that on-off switching of transistor 90 ceases and the voltage across capacitor 96 begins to increase. When the B input of flip-flop 104 receives a sufficiently positive voltage signal, the $\overline{Q}$ output of flip-flop 104 goes LO and line 110 carries a LO signal, indicating that the tare knob 27 has been touched.

The oscillator circuit 75 functions as follows. The manually positionable tare knob 27 is connected through a resistor 112 to one side of transformer 113. The other side of transformer 113 is connected to a positive potential source, which may be approximately 5 volts, and to the collector of transistor 80. The emitter of transistor 80 is fed back through a capacitor 115 to a tap on transformer 113 so as to cause oscillation. A capacitor 118 also forms a part of this oscillating circuit and is selected to produce a tuned oscillating circuit. Whenever knob 27 is touched by an operator, the oscillator circuit is detuned by the body capacitance of the operator so that the oscillation ceases.

Flip-flop 104 is a retriggerable mono-stable multivibrator and conveniently may be half of an integrated circuit such as SN74123 sold by Texas Instruments, Inc., Dallas, Texas. Input A of flip-flop 104 is connected to receive a clock signal from a system timing circuit. Inputs 122 and 123 are connected to a positive source of potential through a timing delay circuit comprising resistor 126, capacitor 127 and diode 128. Flip-flop 104 will maintain a HI signal on the $\overline{Q}$ output while a LO signal is received on the B input. As explained previously, when knob 27 is touched by an operator, a HI signal is produced at the B input of flip-flop 104. The flip-flop 104 will then change state upon receipt of the next negative going clock pulse at its A input. Line 110 will therefore go LO and will remain low as long as knob 27 is touched, and, for a period of time afterwards depending upon the value of resistor 126 and capacitor 127. Typically the multi-vibrator delay time may be set at approximately 700 milliseconds so that the signal at the $\overline{Q}$ output will be held LO for this length of time.

Tare zero switch 70 is mechanically connected to the knob 27. Typically the switch contacts may be arranged to close when the tare knob is set for zero tare adjustment. It should be understood, however, that the switch 70 could be arranged to be momentarily closed whenever the knob 27 is adjusted. When the tare zero switch 70 is open, line 129 is held HI by the voltage source acting through resistor 131. When switch 70 is closed, line 129 will be pulled LO through the switch 70.

The major elements of control circuit means 135 are a pair of identical flip-flops 140 and 145. Flip-flops 140 and 145 may be fabricated as an integrated circuit, such as circuit type SN7474 made by Texas Instruments, Inc., Dallas, Texas. These devices are dual D-type edge triggered flip-flops. In such a device, the Q output takes on the logical state of the signal applied to the input terminal D during a positive-going edge of a trigger pulse applied to terminal T. Terminals S and R are preset and clear terminals, respectively, and operate independently of any clock signal. A LO signal at terminal S will set terminal Q to a HI state and a LO signal at terminal R will set terminal Q to a LO state. The Q and $\overline{Q}$ outputs are complementary.

Input terminals D and T of flip-flop 140 are connected, respectively, to lines 147 and 149, which in turn are connected to receive respectively a minimum weight signal and a reset signal. The minimum weight signal is LO whenever the weight readout by the scale is less than some nominal value and is HI when the reading exceeds that value. Typically this nominal value may be about one-tenth of a pound. Any convenient method may be employed for generating such a minimum weight signal. Suitable apparatus for this purpose is shown, for instance, in U.S. Pat. No. 3,349,760. The reset signal for line 149 is merely a pulse which occurs once each computing cycle.

As further shown in FIG. 3, the R terminal of flip-flop 140 is connected to a positive potential source and the S terminal of flip-flop 140 is connected to ground through capacitor 150 and also to a source of positive potential through resistor 151. The capacitor 150 performs a time delay function so that when the power is first turned on, there is a LO signal at terminal S. This produces a HI output at terminal Q of flip-flop 140 and a LO output at terminal $\overline{Q}$ when the power is first turned on. Thereafter, if there is a LO signal at line 147 (indicating no weight on the scale platform), then with the next occurrence of a reset pulse on line 149, terminal Q will go LO and terminal $\overline{Q}$ will go HI. This change in the $\overline{Q}$ output of flip-flop 140 from an initial LO condition to a subsequent HI condition produces a positive edge trigger for use by flip-flop 145, as hereinafter described.

The preset and clear terminals of flip-flop 145 are connected to receive the outputs of OR gates 155 and 160. OR gate 155 is connected to receive the output of circuit 65 on line 110 and also to receive the $\overline{Q}$ output of flip-flop 140 on line 163. OR gate 160 is connected to respond to the signal applied to line 129 by switch 70 and also to receive the Q output from flip-flop 140. The state of flip-flop 145 controls Darlington amplifier 166 through resistor 168. When the Q output of flip-flop 145 goes HI, Darlington amplifier 166 becomes conductive and current flows through tare warning indicator lamp 60.

The R input of flip-flop 145 will remain at a positive potential unless both the Q output of flip-flop 140 is LO and the tare zero switch 70 is closed. As mentioned previously tare zero switch 70 is mechanically linked to knob 27 and will be closed only when the tare setting is returned to zero or some other predetermined setting. It should be understood, of course, that a linkage arrangement could also be provided in which any change in setting of knob 27 would cause momentarily closure of switch 70.

As described previously, line 110 carries a normally HI signal and is switched temporarily to a LO state when the operator touches knob 27. Thus OR gate 155 normally supplies a HI signal to the S terminal of flip-flop 145 and resistor 131 normally supplies a HI signal to the R terminal of flip-flop 145. Input terminal D of flip-flop 145 is permanently connected to a source of positive potential, and input terminal T is connected to receive the $\overline{Q}$ output from flip-flop 140. As described previously, line 149 assumes an initial LO state at power turn on, and shortly thereafter goes HI. This provides a positive going trigger pulse to terminal T of flip-flop 145 and the output terminal Q of flip-flop 145 then goes HI. Thus at power turn on, lamp 60 provides an initial tare warning indication.

Concurrently with the HI signal on the $\overline{Q}$ output of flip-flop 140, there is a LO signal on the Q output of flip-flop 140 which is connected to OR gate 160. If the tare zero switch 70 is closed at this time, a low signal will be applied to the R input of flip-flop 145, switching its Q output to a LO level, turning off Darlington amplifier 166 and extinguishing lamp 60.

Thereafter, when an item to be weighed is placed on the scale platform the next occurring clock pulse on line 149 will cause flip-flop 140 to change states. The Q output will then be HI and the $\overline{Q}$ will be LO. Since the signal on line 110 will normally be HI at this point and switch 70 will normally be opened, this state change of flip-flop 140 will have no effect on the rest of the circuit. Consequently, the Q output of flip-flop 145 will remain LO and tare lamp 60 will remain off. Then when the weighing operation is completed and the weight is removed from the scale platform, flip-flop 140 will reset, causing a positive going signal to be applied to the T input of flip-flop 145. Flip-flop 145 is then switched so as to light tare lamp 60. Thus tare lamp 60 is turned on after each weighing operation and may be extinguished only by the closure of switch 70 while less than a small predetermined amount of weight is on the scale platform.

The circuit illustrated in FIG. 3 further provides a error detecting feature to provide a warning if the operator should touch the tare adjustment knob while an item is being weighed on the scale. As mentioned previously when an item to be weighed is placed on the scale platform, flip-flop 140 will be set so that a HI signal is applied to OR gate 160 and a LO signal is applied to OR gate 155. If the tare knob 27 is touched at this point, a LO signal will be applied to line 110, with the result that OR gate 155 will apply a LO signal to the S input of flip-flop 145. Thus flip-flop 145 will be set to switch Darlington amplifier 166 on and will light tare lamp 60. A customer will therefore know that something is amiss, even though he may not see the operator touch the tare adjustment knob 27, and the operator will be obliged to remove the weight from the platform and repeat the entire weighing procedure.

Referring now to FIG. 4, there is shown a portion of a circuit representing an alternative embodiment of the present invention. Specifically, a different control circuit means 135' is shown. In this alternative embodiment, control circuit 135' is utilized in place of the control circuit 135 shown in FIG. 3. The two embodiments are identical in all other respects. As seen by comparing FIGS. 3 and 4, the control circuit 135' is changed slightly by providing a three-input OR gate 160' which is responsive to the Q output of flip-flop 140 and line 129, as in the previous embodiment, and also to line 110. This circuit change results in a slightly modified method of circuit operation. Specifically, for the tare lamp 60 to be turned off, OR gate 160' must provide a LO signal to the R input of flip-flop 145. This will happen only on the simultaneous occurrence of three conditions. First the tare zero switch must be closed. Second there must be less than the predetermined minimum weight on the scale platform. Third the tare adjustment knob 27 must be touched by the operator.

In the embodiment shown in FIG. 3, if the operator left the tare adjustment knob 27 set to a zero, the conditions necessary to extinguish the tare lamp 60 would be satisfied after each weighing operation. That is, the tare zero switch would be closed after the weighing operation and the Q output of flip-flop 140 would go LO as a result of the load being removed from the scale platform. In the embodiment shown in FIG. 4, however, an operator will be reminded after each scale weighing operation of the need to adjust the tare setting. Even if the tare adjustment remains set to zero, lamp 60 will not be extinguished after a weighing operation until knob 27 is manually touched by the operator.

The following is a table listing typical values for the circuit elements shown in FIG. 3.

| Element | Typical Value |
|---|---|
| 80 | 2N5449 |
| 90 | 2N5449 |
| 91 | 100 pfd.; 1KV |
| 94 | 270 ohms ± 10%; ¼ watt |
| 96 | .22 mfd. |
| 99 | 2200 ohms |
| 104 | Integrated circuit; type SN74123 |
| 106 | 1800 ohms ± 10%; ¼ watt |
| 107 | 680 ohms ± 10%; ¼ watt |
| 108 | 18K ohms ± 10%; ¼ watt |
| 109 | 1800 ohms ± 10%; ¼ watt |
| 114 | 560 ohms ± 10%; ¼ watt |
| 115 | .01 mfd.; 25V |
| 118 | 200 pfd.; 1KV |
| 126 | 33K ohms ± 10%; ¼ watt |
| 127 | 68 mfd.; 15V |
| 128 | 1N914 |
| 131 | 1K ohms ± 10%; ¼ watt |
| 140 | Integrated circuit; SN7474N |
| 145 | Integrated circuit; SN7474N |
| 150 | 10 mfd.; 6V |
| 151 | 3.3K ohms ± 10%; ¼ watt |
| 155 | Integrated circuit; type SN7432N |
| 160 | Integrated circuit; type SN7432N |
| 166 | 2N5306 |
| 168 | 680 ohms ± 10%; ¼ watt |

While the form of apparatus herein described constitutes a preferred embodiment of the invention, it is to be understood that the invention is not limited to this precise form of apparatus and that changes may be made therein without departing from the scope of the invention.

What is claimed is:

1. In a system for weighing a load in a container, the combination comprising:
   a weighing mechanism adapted to determine the difference between the weight of a load applied thereto and the tare weight of the load container,
   tare adjusting means for entering said tare weight into said weighing mechanism,
   manually operable means for controlling said tare adjusting means,
   signal means for producing a tare warning indication,
   first sensing means for determining when said manually operable means is manually touched, and second sensing means for determining when said manually operable means changes the tare weight, and
   control circuit means, responsive to said first and second sensing means, for causing said signal means to produce a warning indication when said manually operable means is manually touched while said weighing mechanism has a substantial load supplied thereto, and for terminating said tare warning indication when said manually operable means changes said tare weight while said weighing mechanism does not have a substantial load applied thereto.

2. The system of claim 1 in which said first sensing means includes an oscillator circuit connected for alteration of its oscillation state whenever said manually operable means is touched by an operator.

3. The combination of claim 1 wherein said control circuit means includes means for terminating said tare warning indication when said manually operable means is manually touched as the tare weight is changed while said weighing mechanism does not have a substantial load applied thereto between weighing operations.

4. In a scale system for weighing articles having tare adjustment means, tare adjustment indicating means comprising:
   a. a tare warning indicator,
   b. a knob connected for control of said tare adjustment means,
   c. an oscillation circuit connected for alteration of its oscillation state whenever said knob is touched by an operator,
   d. switch means for changing state when said tare adjustment means is adjusted, and
   e. control circuit means, responsive to said oscillation circuit and said switch means, for deactivating said indicator when said tare adjustment means is adjusted while no article is being weighed.

5. The tare indicating means of claim 4 in which said control means will deactivate said indicator only when said tare adjustment means is placed manually in a zero tare condition.

6. The tare indicating means of claim 4 wherein said control circuit means also includes means for activating said indicator when said knob is touched by the operator while an article is being weighed by said scale system.

7. In a weighing scale which includes an article receiving platform, weight indicating means indicating the weight of articles placed on said platform, tare weight compensation means for reducing the indicated weight of an article by the weight of its container such that the proper net weight is indicated by said weight indicating means, and tare weight adjustment means for manually setting a tare weight correction, the improvement comprising:
   first means generating a near-zero weight signal while said weight indicating means indicates weight within a predetermined range,
   second means generating a tare zero signal when said tare weight adjustment means is set for zero tare weight, and
   tare warning indicator means, responsive to said first means and to said second means, for providing a tare warning indication at the completion of a weighing operation until said near-zero weight signal and said tare zero signal have been simultaneously received.

8. In a weighing scale which includes a weighing platform, weight indicating means responsive to loading on the weighing platform, tare weight adjusting means for entering the tare weight of the load and for supplying such tare weight to said weight indicating means, the improvement comprising:
   means generating a completion signal at the end of each weighing operation,
   means generating a tare change signal in response to alteration of the tare weight by the tare weight adjusting means,
   tare warning means responsive to said means generating a completion signal and to said means generating a tare change signal for generating a tare warning signal at the completion of each weighing operation until receipt of a tare change signal.

9. The weighing scale of claim 8 in which said means generating a completion signal comprises means responsive to said weight indicating means indicating less than a predetermined weight.

10. The weighing scale of claim 8 in which said tare warning means generates a warning signal in response to manual touching of said tare weight adjusting means by an operator while said weight indicating means indicates more than a predetermined weight.

* * * * *

UNITED STATES PATENT AND TRADEMARK OFFICE
CERTIFICATE OF CORRECTION

PATENT NO. : 4,029,162
DATED : June 14, 1977
INVENTOR(S) : James J. Krolick, deceased, Edwin E. Boshinski It is certified that error appears in the above-identified patent and that said Letters Patent are hereby corrected as shown below:

Column 1, line 50, "weighting" should be --weighing--.

Column 7, line 54, "supplied" should be --applied--.

Signed and Sealed this

Fourth Day of October 1977

[SEAL]

Attest:

RUTH C. MASON
Attesting Officer

LUTRELLE F. PARKER
Acting Commissioner of Patents and Trademarks